May 1, 1951     C. A. BROWN     2,550,907

TEMPERATURE CONTROLLED MIXING VALVE

Original Filed March 1, 1944

Inventor
Clyde A. Brown by The Firm of Charles H. Hill    Attys

Patented May 1, 1951

2,550,907

UNITED STATES PATENT OFFICE 2,550,907

TEMPERATURE CONTROLLED MIXING VALVE

Clyde A. Brown, Luck, Wis., assignor to The Dole Valve Company, Chicago, Ill., a corporation of Illinois Original application March 1, 1944, Serial No. 524,546. Divided and this application February 18, 1948, Serial No. 9,114

4 Claims. (Cl. 236—12)

This invention relates to apparatus for producing a uniform fluid mixture from a plurality of individual fluids each of which possesses certain distinct characteristics; and more particularly, to a thermostatically controlled mixer valve.

The term "physical characteristic," as hereinafter employed, refers either to the inherent property of the fluid; or to a temporarily imposed condition or state of the fluid, such, for example, as temperature or pressure.

In the production of any fluid mixture having a certain predetermined degree of uniformity from a plurality of different fluid supplies, it is necessary to take into account certain variations which may inadvertently occur in the fluid supplies as they are introduced into the mixing area. Thus, for example, unless special precautions are taken in producing a mixed water supply of predetermined uniform temperature, variations in pressure and temperature of each of the individual supplies going to make up the mixture will result in the non-uniformity of the ultimate combination.

The present invention, therefore, contemplates means for producing a uniform fluid mixture having certain predetermined optimum characteristics from a plurality of individual fluid supplies having different physical characteristics or properties and for obtaining this uniform mixture irrespective of changes in the physical characteristics or properties of the component fluid supplies.

It is an object of the present invention to provide a novel means for producing a uniform fluid mixture from a plurality of fluid supplies having different physical characteristics or properties.

It is a further object of the present invention to provide novel means for employing one or more of the characteristics or properties of the individual fluid supplies in controlling the admission of the proper proportions of the component fluids to produce the desired fluid mixture.

Another and further object of the present invention is to provide a novel temperature controlled mixer valve.

Figure 1:
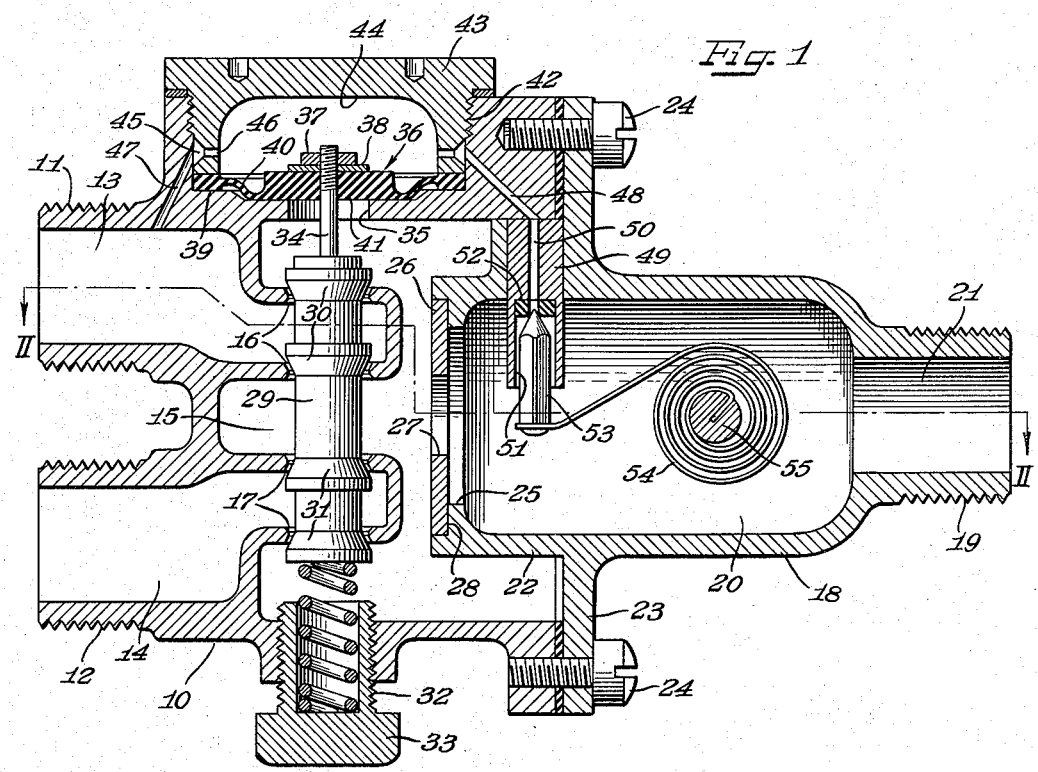
Figure 2:
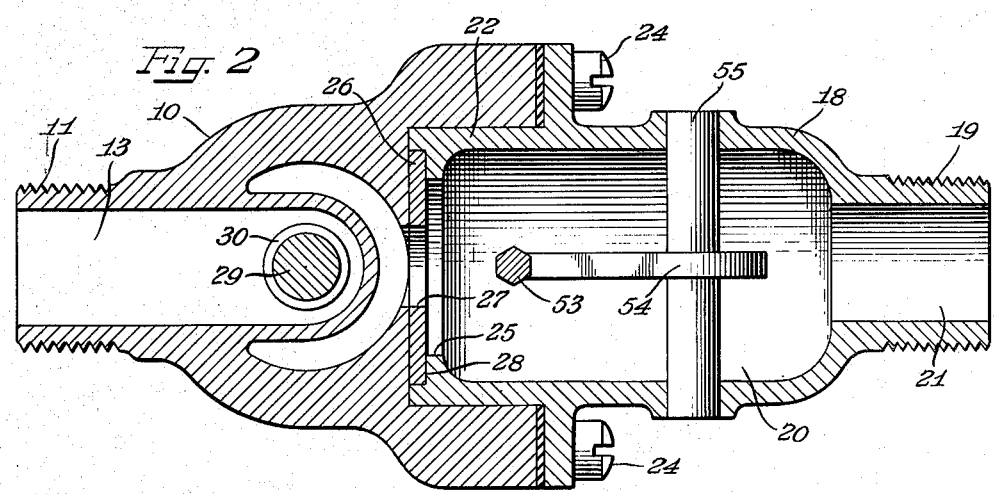

The novel features which I believe to be characteristic of my invention are set forth with particularity in the appended claims. My invention itself, however, both as to its manner of construction and method of operation, together with further objects and advantages thereof may best be understood by reference to the following description taken in connection with the accompanying drawing, in which:

Figure 1 is a longitudinal sectional view through a temperature controlled mixing valve embodying the novel teachings and principles of the present invention; and Figure 2 is a sectional view through the mixing valve of Figure 1 as taken along the line II—II of Figure 1.

This application is a division of my copending application for "Method of and Means for Producing a Uniform Fluid Mixture," U. S. Serial No. 524,546, filed March 1, 1944, now U. S. Patent No. 2,449,766, issued September 21, 1948, and assigned to the same assignee as the present invention.

As shown in Figures 1 and 2 of the drawing, the valve unit is of the single diaphragm pilot operated type which is advantageously employed in mixing hot and cold water to produce a mixed water supply of predetermined constant temperature. The valve unit comprises a casing 10 having externally threaded fluid connections 11 and 12, the first of which is arranged to be connected to a suitable hot fluid supply conduit, and the other is arranged to be connected to a suitable cold fluid supply conduit. The connections 11 and 12 have inlet passages 13 and 14, respectively, associated therewith which connect with a mixing chamber 15 disposed internally of the casing 10 as by means of the outlet openings 16 and 17, respectively, taking the form of valve seats.

An extension 18 has an outlet connection 19 which is externally threaded for receiving a suitable conduit for handling the mixed fluid discharged from the thermostat chamber 20 therein through the outlet 21. The extension 18 comprises a projection 22 which extends through the wall of the casing 10 in such fashion that the flanged portion 23 of the extension 18 may be secured to said casing, as, for example, by screws 24. A suitable gasket may advantageously be provided to prevent leakage between the casing 10 and the extension 18.

The thermostat chamber 20 in the extension 18 communicates with the mixing chamber 15 in the casing 10 as by means of an opening 25. The opening 25 which extends through the end wall of the projection 22 has a plate 26 mounted therein having a centrally disposed orifice 27. The plate 26 may be secured in the end of the projection 22 of extension 18 as by being press fit against a shoulder 28 formed about the opening 25 in the end of said projection 22.

The valve for controlling the flow of fluid through each pair of outlet openings 16 and 17 in the inlet passages 13 and 14, respectively, advantageously takes the form of a spool valve 29. The valve 29 has a plurality of spaced, generally frusto-conically shaped portions 30 and 31 thereon for seating in said outlet openings 16 and 17. The valve 29 is supported at one end thereof by means of a coil spring 32 which is adapted to be adjustably positioned against the end of said valve as by means of the guide member 33 adjustably threaded into the wall of casing 10.

The valve 29 has a threaded rod 34 extending substantially axially from its other end through an opening 35 in the wall of the casing 10 to engage a diaphragm 36. The rod 34 extends through a centrally disposed aperture in the diaphragm 36 and is secured thereto by a nut 37 threaded on rod 34 and backed by a washer 38. The diaphragm 36 has an annular bead 39, an imperforate web portion 40, and a reinforced centrally disposed portion 41.

A bore 42 is provided in the wall of the casing 10 and disposed concentrically with the opening 35 to receive diaphragm 36 which is held in place in the base thereof by the thimble 43 which is threaded into the bore 42 and engages the bead 39 of said diaphragm. The joint formed between the thimble 43 and the outer wall of the casing 10 may conveniently be sealed by the use of suitable gaskets.

The thimble 43 is provided with a recess 44 in the underside thereof disposed adjacent the diaphragm 36. The recess 44 is adapted to communicate with an annular groove 45 formed about the external periphery of the thimble 43 adjacent the end thereof contacting the bead portion 39 of the diaphragm 36 through a plurality of ports 46 extending substantially radially through the wall of said thimble 43.

The annular groove 45 on the thimble 43 advantageously forms a completely closed channel with respect to the wall of the bore 42 in the casing 10 and is connected, as by means of a passageway 47, with the inlet passage 13 associated with the hot fluid connection 11. A similar passageway 48 connects the aforementioned channel formed between the annular groove 45 and the wall of the bore 42 with the external periphery of the projection 22 of the extension 18.

A guide member 49 which may advantageously be of generally cylindrical form is inserted in and extends through the wall of the projection 22 of the extension 18. The guide member 49 is so disposed that an axially extending passage 50 in said guide member 49 connects the base of a bore 51 therein with the passageway 48 formed in the casing 10 and connecting with the groove 45. The bore 51 in the inserted guide member 49 is provided in its base with a substantially flexible washer element 52, the central aperture of which registers with the passage 50 and is adapted to receive for controlling the flow of fluid therethrough the substantially conically shaped end of a pilot valve 53 which extends into the bore 51.

The pilot valve 53 is secured to the free end of a thermo-sensitive means in the form of a bimetal coil type thermostatic element 54. The other end of thermostatic element 54 is secured to a pin 55 which is disposed within and extends transversely of the thermostat chamber 21 in the extension 18.

The operation of the above described thermostatically controlled mixer valve will now be referred to.

For the purpose of illustration, let us assume that the temperature of the fluid mixture rises above that for which the thermostatic element 54 is adjusted. In such case, the thermostatic element 54 causes the pilot valve 53 to approach a seating position against the washer 52, as shown in Figure 1, thereby temporarily closing off the passageway 48 and passage 50 to cause the fluid pressure within the recess 44 to increase. This increased pressure on the diaphragm 36 causes the valve 29 to move axially against the spring 32 thereby tending to seat the frusto-conical portions 30 in the outlets 16 reducing the flow of hot fluid admitted to mixing chamber 15 from inlet passage 13. The frusto-conical portions 31 are simultaneously caused to move away from a seating position in outlets 17 thereby increasing the flow of cold fluid to the mixing chamber 15.

As soon as the temperature of the mixed fluid is adjusted to the predetermined temperature setting for the thermostatic element 54, the pilot valve 53 is immediately shifted to open the passageway 48 and passage 50. This operation reduces the fluid pressure in recess 44 and permits the spring 32 to overcome the pressure against diaphragm 36, thereby shifting valve member 29 to reduce the flow of cold fluid and increase the flow of hot fluid into the mixing chamber 15.

The opposite operation takes place if the temperature of the mixed fluid drops. The mixer valve unit of Figure 1 is sensitive to pressure variations occurring in the individual fluid supplies.

The principle of operation involved, therefore, is one of utilizing the pressure in one of the individual fluid supplies controlled by a pilot valve actuated by a thermo-sensitive element to create a pressure differential to open and close the outlets through which the fluid supplies are admitted to the mixing area.

While I have shown a particular embodiment of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. A mixer valve comprising a housing, an inlet in said housing for each of two fluids under pressure, valve means in each of said inlets, an outlet in said housing for the mixed fluid, a mixing chamber in said housing, an auxiliary fluid chamber within said housing in constant and unvarying fluid communication with only one of said inlets, a flexible membrane separating said auxiliary chamber from said mixing chamber and directly exposed to the fluid pressure of both chambers, a fluid drain for said auxiliary chamber, a pilot valve in said drain, said pilot valve being mounted to selectively open and close said drain, spring means positioned to supplement the force exerted on said membrane by the fluid pressure in said mixing chamber and thereby balance the force exerted on said membrane by the fluid pressure of said auxiliary chamber, said valve means being operatively connected to said membrane to be moved thereby to simultaneously open one inlet and close the other in varying degree to control the admission of fluid to the mixing chamber.

2. A mixer valve comprising a housing, an inlet in said housing for each of two fluids under pressure, valve means in each of said inlets mechanically connected together to operate as a single unit, an outlet in said housing for the mixed fluid, a mixing chamber in said housing between said inlets and said outlet, an auxiliary fluid chamber within said housing in constant and unvarying fluid communication with one of said inlets, a flexible membrane separating said auxiliary chamber from said mixing chamber and directly exposed to the fluid pressure of both chambers, said valve means being mechanically connected to said membrane, biasing means normally urging said valve means to a position which tends to reduce the size of said auxiliary chamber, a fluid drain for said auxiliary chamber, said biasing means being balanced against the differential force acting on said membrane, a pilot valve in said drain, said pilot valve being mounted to selectively open and close said drain thereby to simultaneously open one inlet and close the other in varying degree to control the admission of fluid to the mixing chamber.

3. A mixer valve comprising a housing, an inlet in said housing for each of two fluids under pressure, valve means in each of said inlets mechanically connected together to operate as a single unit, an outlet in said housing for the mixed fluid, a mixing chamber in said housing between said inlets and said outlet, an auxiliary fluid chamber within said housing in constant and unvarying fluid communication with one of said inlets, a flexible membrane separating said auxiliary chamber from said mixing chamber, and directly exposed to the fluid pressure of both chambers, said valve means being mechanically connected to said membrane, biasing means normally urging said valve means to a position which tends to reduce the size of said auxiliary chamber, said biasing means being balanced against the differential force acting on said membrane, a fluid drain for said auxiliary chamber, a pilot valve in said drain, thermal responsive means mounted in said mixing chamber and connected to said pilot valve to selectively open and close said drain in response to variations in the temperature of the mixed fluid.

4. A mixer valve comprising a housing, an inlet in said housing for each of two fluids under pressure, a unitary valve member having valve portions in each of said inlets and mounted so that when one valve portion is closing its associated inlet another valve portion is opening its associated inlet, an outlet in said housing for the mixed fluid, a mixing chamber in said housing between said inlets and said outlet, an auxiliary fluid chamber within said housing opposite one end of said unitary valve member, a compression spring mounted in said housing opposite the other end of said unitary valve member and bearing thereagainst to urge said unitary valve member toward said auxiliary chamber, a flexible membrane separating said auxiliary chamber from said mixing chamber, a portion of said membrane being secured to said one end of said unitary valve member, an open fluid passageway between one of said inlets and said auxiliary chamber, a second fluid passageway between said auxiliary chamber and said mixing chamber, a pilot valve in said second fluid passageway, and a temperature responsive element disposed in said mixing chamber and connected to said pilot valve to selectively move said pilot valve to open and closed positions when the temperature of the mixed fluid varies from a predetermined desired temperature.

CLYDE A. BROWN.

REFERENCES CITED

The following references are of record in the file of this patent:

UNITED STATES PATENTS

| Number | Name | Date |
| --- | --- | --- |
| 1,869,663 | Cartier | Aug. 2, 1932 |
| 2,217,017 | Hooper | Oct. 8, 1940 |
| 2,272,403 | Fields | Feb. 10, 1942 |
| 2,308,165 | Fields | Jan. 12, 1943 |
| 2,310,975 | Lund | Feb. 16, 1943 |
| 2,415,994 | Curtis | Feb. 18, 1947 |

FOREIGN PATENTS

| Number | Country | Date |
| --- | --- | --- |
| 720,112 | France | Dec. 3, 1931 |